United States Patent
Gan et al.

(10) Patent No.: US 12,469,216 B2
(45) Date of Patent: Nov. 11, 2025

(54) THREE-DIMENSIONAL INVERSION METHOD OF AIRBORNE TRANSIENT ELECTROMAGNETICS BASED ON DEEP LEARNING

(71) Applicant: Yangtze Delta Region Institute (Huzhou), University of Electronic Science and Technology of China, Huzhou (CN)

(72) Inventors: Lu Gan, Huzhou (CN); Rongjiang Tang, Huzhou (CN)

(73) Assignee: Yangtze Delta Region Institute, University of Electronic Science and Technology of China, Huzhou (CN)

( * ) Notice: Subject to any disclaimer, the term of this patent is extended or adjusted under 35 U.S.C. 154(b) by 160 days.

(21) Appl. No.: 18/386,087

(22) Filed: Nov. 1, 2023

(65) Prior Publication Data
US 2025/0037363 A1    Jan. 30, 2025

(30) Foreign Application Priority Data
Jul. 25, 2023   (CN) .......................... 202310918290.7

(51) Int. Cl.
*G06T 17/00* (2006.01)
*G06T 5/70* (2024.01)
(52) U.S. Cl.
CPC ................ *G06T 17/00* (2013.01); *G06T 5/70* (2024.01)
(58) Field of Classification Search
None
See application file for complete search history.

(56) References Cited

U.S. PATENT DOCUMENTS

| | | | |
|---|---|---|---|
| 2015/0077560 A1* | 3/2015 | Zhang ..................... | G06V 20/58 348/148 |
| 2016/0104316 A1* | 4/2016 | Shenkar ................... | G06T 17/05 345/419 |
| 2020/0183041 A1* | 6/2020 | Denli ....................... | G01V 20/00 |
| 2024/0054265 A1* | 2/2024 | Cai ......................... | G06F 30/367 |
| 2024/0177465 A1* | 5/2024 | Xue .......................... | G06T 7/50 |

OTHER PUBLICATIONS

Puzyrev, "Deep learning electromagnetic inversion with convolutional neural networks," Geophysical Journal International 218.2 (2019): 817-832 (Year: 2019).*

* cited by examiner

*Primary Examiner* — Anh-Tuan V Nguyen
(74) *Attorney, Agent, or Firm* — Corner Counsel, LLC

(57) ABSTRACT

The present disclosure discloses a three-dimensional inversion method of airborne transient electromagnetics based on deep learning. The method of the present disclosure proposes two strategies that focus on training datasets, to improve the performance of deep learning models, including divide and conquer strategy and random models generating. Through a large of reasonable structural models, appropriate network setups, a more generalized result can be obtained through our proposed U-Net framework, which has been demonstrated to be effective on both synthetic and field data. This scheme can realize the rapid prospecting of three-dimensional resistivity structure in large-area target region, and solve the problem of low efficiency of traditional three-dimensional inversion calculation of ATEM and poor migration ability of three-dimensional inversion based on deep learning developed by predecessors.

2 Claims, 7 Drawing Sheets

THREE-DIMENSIONAL INVERSION METHOD OF AIRBORNE TRANSIENT ELECTROMAGNETICS BASED ON DEEP LEARNING

CROSS-REFERENCE TO RELATED APPLICATIONS

This application claims priority under 35 U.S.C. § 119(a) to Chinese Patent Application No. 202310918290.7, filed on Jul. 25, 2023, which is hereby incorporated by reference herein in its entirety.

TECHNICAL FIELD

The present disclosure relates to the technical field of underground structure prospecting, in particular to a three-dimensional inversion method of airborne transient electromagnetics based on deep learning.

BACKGROUND ART

Airborne Transient Electromagnetics (ATEM) is a time domain electromagnetic induction geophysical prospecting method. ATEM boasts an extensive spatial coverage with dense sampling, synchronous in-flight observations, and exceptionally high operational efficiency. It exhibits robust adaptability to complex terrains, particularly excelling in surveying tasks in mountainous regions, deserts, hilly terrain, lakes, and areas with substantial vegetation cover. These attributes position it with significant promise for diverse applications across various infrastructure development sectors.

Despite the substantial research efforts and significant progress made by scholars in ATEM inversion over the past thirty years, there still exist a series of pressing issues in need of resolution. On the one hand, the inversion of field ATEM data is usually based on one-dimensional layered media. However, under the influence of three-dimensional effects of underground anomalies, data errors and topographic fluctuation, the inversion at different observation points may exhibit significant disparities. This can lead to poor lateral continuity in inversion profiles and potentially result in noticeable false anomalies, posing great challenges to comprehensive geological and geophysical interpretation. On the other hand, while the three-dimensional inversion can provide more detailed information about the resistivity distribution information of underground media, it remains challenging in practical application, primarily for the following reasons. First, three-dimensional inversion involves enormous computational requirements: generally, the number of grids to meet the exploration needs is required to be more than 200,000, and the time for a single solution is about 10 minutes with the current high-performance CPU (taking Intel® Core i9-12900K, 3.20 GHz as an example); if the data collection includes 30 time channels and 100 observation points, a single three-dimensional inversion would take at least 10 hours, making it difficult to meet the real-time inversion requirements for large volumes of ATEM data. Secondly, three-dimensional inversion is significantly influenced by parameters: during the inversion process, accurate matching of parameters such as the waveform of the transmitted current, current magnitude, coil area, coil geometry, and flight altitude with the actual conditions is essential, otherwise the inversion results may be greatly deviated. Furthermore, easy to fall into local minimum: gradient-based methods are usually used in the three-dimensional inversion of the transient electromagnetic, and its optimization process is easy to fall into local minimum, which leads to insufficient fitting degree of observation data, poor data interpretation and low reliability of inversion results. What's more, the three-dimensional inversion is challenging to provide uncertainty estimates.

In recent years, several studies have successfully applied deep learning algorithms to one-dimensional inversion of airborne transient electromagnetics. However, the application of deep learning technology to three-dimensional inversion of ATEM still faces great challenges. Different from image classification, natural language processing and other fields, when deep learning is applied to complex physical systems and engineering problems, it usually faces the problem of lack of training samples. In order to solve this problem, many scholars synthesize a sufficient number of labeled samples through numerical simulations. However, for three-dimensional heterogeneous earth models with diverse subsurface resistivity structures, it is difficult to construct a sufficient number of representative training data sets that allow neural networks to learn all the key features of the data sets. Moreover, publicly available realistic subsurface electrical models are relatively limited. This often results in deep learning predictions exhibiting lower data fitting performance compared to traditional inversion methods. Regarding the three-dimensional inversion of ATEM, the existing three-dimensional electromagnetic inversion technology based on deep learning is primarily suitable for specific areas and scenes, or involves parameterized inversions, leading to limited applicability. Consequently, the current practical application of transient electromagnetic is still dominated by the one-dimensional inversion, and further development of deep learning methods to address geophysical high-dimensional inversion problems is an urgent need.

SUMMARY

In order to solve the above technical problems, the present disclosure provides a three-dimensional inversion method of airborne transient electromagnetics based on deep learning. It adopts the idea of divide and conquer strategy, decomposing a large-scale region into multiple local three-dimensional models, training and predicting them, and forming a final large-scale three-dimensional model. The method can realize rapid prospecting of three-dimensional resistivity structure in a large target region, effectively improving computational efficiency and the migration capability of three-dimensional inversion based on deep learning, therefore, the method is expected to break through the bottleneck encountered in current three-dimensional prospecting imaging of ATEM.

The three-dimensional inversion method of airborne transient electromagnetics based on deep learning according to the present disclosure comprises the following steps.

Step 1, decomposing a target region to be prospected into a plurality of local three-dimensional models. In the Step 1, based on the divide-and-conquer strategy for 3D deep learning-based inversion, a large-scale target geological region is decomposed into at least two local three-dimensional models, depending on the size of target area. Subsequently, deep learning techniques are utilized to train and predict the models within the local regions.

Step 2, generating a large number of underground resistivity models at random, performing forward calculation on the underground resistivity models to obtain TEM responses, and constructing a training dataset for each of the local three-dimensional models. In the Step 2 according to the present embodiment, developing algorithms for generating at least 5,000 underground resistivity models at random, performing forward calculation using finite volume method on the underground resistivity models to obtain transient electromagnetic responses, and use local three-dimensional models (labels) and the transient electromagnetic responses (input) as the training dataset.

Step 3, constructing a deep learning network model and training it based on the local three-dimensional models and TEM responses. That is, constructing a U-Net for transient electromagnetic inversion tasks, wherein selecting mean square error as loss function that measures the difference between the model's predictions and the synthetic underground resistivity distribution, and then, choosing an Adam as optimization algorithm to update the model's weights during training.

Step 4, inverting each of the local three-dimensional models, and then recombining inverted local three-dimensional models to form a final three-dimensional model. In the Step 4, predicting local three-dimensional models based on transient electromagnetic responses, and the inverted models are reassembled to form the ultimate large three-dimensional model.

According to embodiments of the present disclosure, in Step 2, generating underground resistivity models using a random model generation algorithm includes the following steps:

Step 2-1, generating a layered resistivity model R (l) at random, wherein the resistivity gradually increases with the depth, and the minimum resistivity range obeys a uniform distribution U (log 10 (1), log 10 (100)) Ω·m, while the resistivity variation range also obeys a uniform distribution U (log 10 (100), log 10 (10000)) Ω·m;

Step 2-2, generating a three-dimensional model grid m with values randomly distributed for each grid, thereby obtaining a random noise model;

Step 2-3, smoothing the three-dimensional model;

Step 2-4, normalizing the data of each layer of the smoothed three-dimensional model, with values distributed within [0,1];

Step 2-5, applying the following formula to process the data of each layer in the case where the resolution of TEM exponentially attenuates with depth:

$$m(l) = \left(1.0 + m(l) * wight * e^{\tau l}\right) * R(l),$$

where l represents the number of layers, $\tau$ represents the attenuation index, with a higher $\tau$ corresponding to a smoother model; wight controls the overall smoothness, which is the same for each layer but different for each model, with a value range of [0.2,1]; m is a three-dimensional inhomogeneous resistivity model, in which with the increase of depth, the resistivity changes more smoothly; and R(l) represents a function of resistivity varying with depth;

Step 2-6, performing nearest neighbor interpolation on m using an octree grid to obtain a model suitable for rapid numerical simulation.

According to embodiments of the present disclosure, in Step 3, the deep learning network model has four layers on each side, including 14 convolution layers, 3 pooling layers and 3 transposed convolution layers. RELU activation function acts on the output of the convolution layer; After convolution operation, Batch_normalization is used to standardize the data. L2 regularization is used for neuron weights in the reciprocal three layers. Finally, the mean square error between labels label and prediction results predi is used as the index to evaluate the performance of the U-Net:

$$mse = \|predi - label\|^2 + \lambda\|predi\|^2.$$

According to embodiments of the present disclosure, in Step 4, the size of the inversion region and the distribution of measuring points are consistent with the training set. The inversion results are reassembled according to the original order, and the inversion results of the overlapping parts between different local regions are weighted averaged. Finally, the three-dimensional inversion model of the target region is reconstructed.

The method of the present disclosure proposes to construct a training set based on small-scale regions, which reduces the complexity of the geoelectric model, improves the generalization ability of the neural network, greatly improves the computational efficiency, and lay the foundation for real-time inversion. The random model generation algorithm designed in the present disclosure constructs the training set. The algorithm can give a resistivity model conforming to TEM resolution, thus reducing the non-uniqueness of inversion, improving the accuracy of deep learning, greatly reducing the dependence of inversion results on prior parameters, and making the inversion results more stable and reliable. The algorithm proposed by the present disclosure can give a large number of predictions conforming to observation data based on ATEM inversion of massive data, and the uncertainty of the model can be obtained by statistical analysis, which is of great significance for evaluating the reliability of inversion results; The method proposed in the present disclosure greatly reduces the training complexity of geoelectric model in the training data set. Through the design of loss function, the model training and prediction are more stable, which meets the inherent requirements of regularization inversion, and improves the prediction precision and generalization ability of deep learning. Therefore, the method proposed in the present disclosure can be applied to more general situations.

DETAILED DESCRIPTION

In order to fully understand the purpose, features and effects of the present disclosure, the following will provide a more detailed description of the present disclosure with the embodiments and the accompanying drawings.

Figure 1:
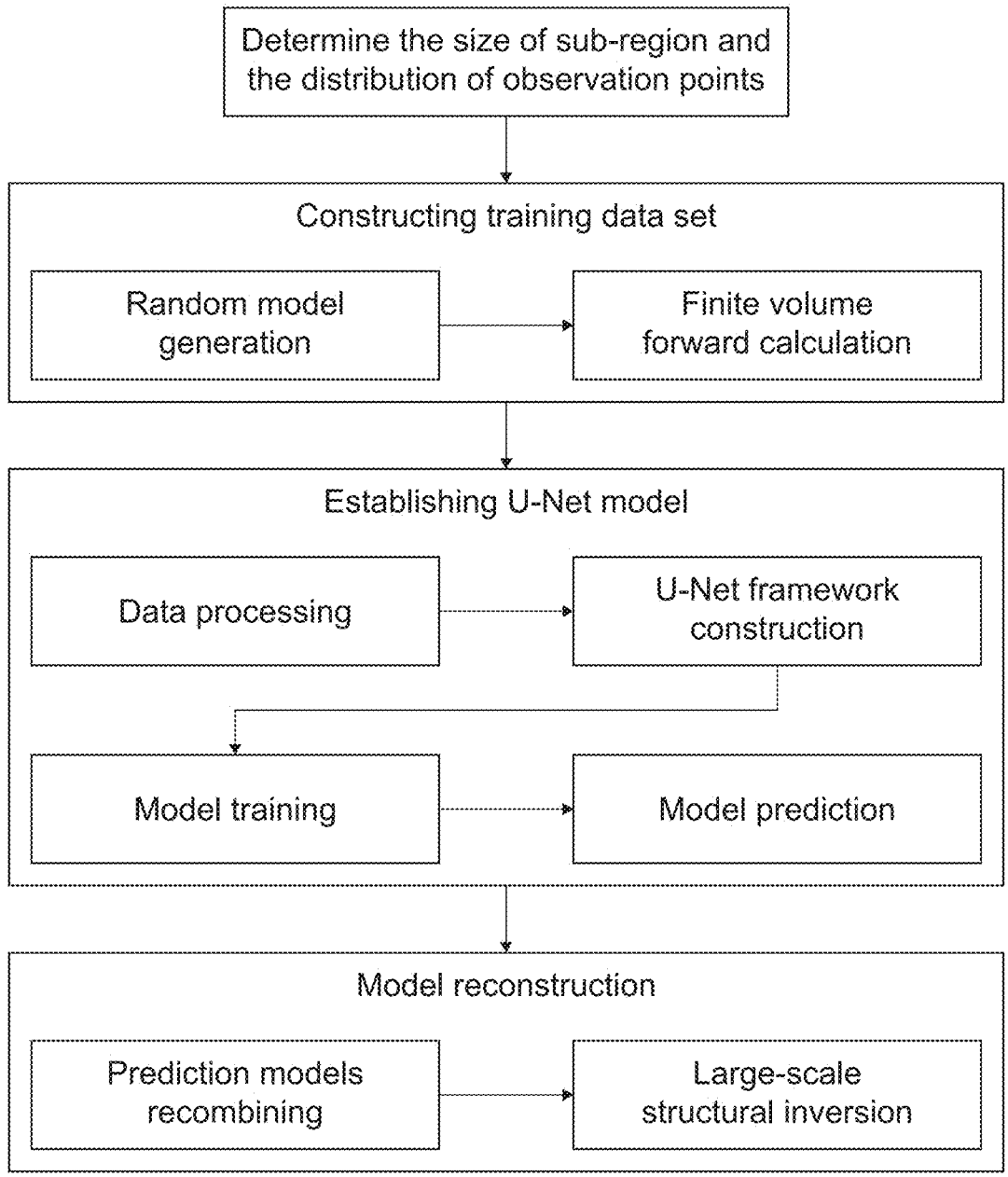
FIG. 1 is a flowchart of a three-dimensional inversion method of airborne transient electromagnetics based on deep learning according to the present disclosure.

As shown in FIG. 1, a three-dimensional inversion method of airborne transient electromagnetics based on deep learning according to the present disclosure comprises the following step.

Step 1, decomposing a region to be prospected into a plurality of local three-dimensional model. In the Step 1, based on the divide-and-conquer strategy for 3D deep learning-based inversion, a large-scale target geological region is decomposed into at least two local three-dimensional models, depending on the size of target area. Subsequently, deep learning techniques are utilized to train and predict the models within the local regions.

Step 2, generating a large number of underground resistivity models at random, performing forward calculation on the underground resistivity models to obtain TEM responses, and constructing a training dataset for each of the local three-dimensional model. In the Step 2 according to the present embodiment, developing algorithms for generating at least 5,000 underground resistivity models at random, performing forward calculation using finite volume method on the underground resistivity models to obtain transient electromagnetic responses, and use local three-dimensional models (labels) and the transient electromagnetic responses (input) as the training dataset.

Step 3, constructing a deep learning network model and training it based on the local three-dimensional models and TEM responses. That is, constructing a U-Net for transient electromagnetic inversion tasks, wherein selecting mean square error as loss function that measures the difference between the model's predictions and the synthetic underground resistivity distribution, and then, choosing an Adam as optimization algorithm to update the model's weights during training.

Step 4, inverting the local region three-dimensional models, and then recombining inverted local three-dimensional models to form a final three-dimensional model. In the Step 4, predicting local three-dimensional models based on transient electromagnetic responses, and the inverted models are reassembled to form the ultimate large three-dimensional model.

Figure 2:
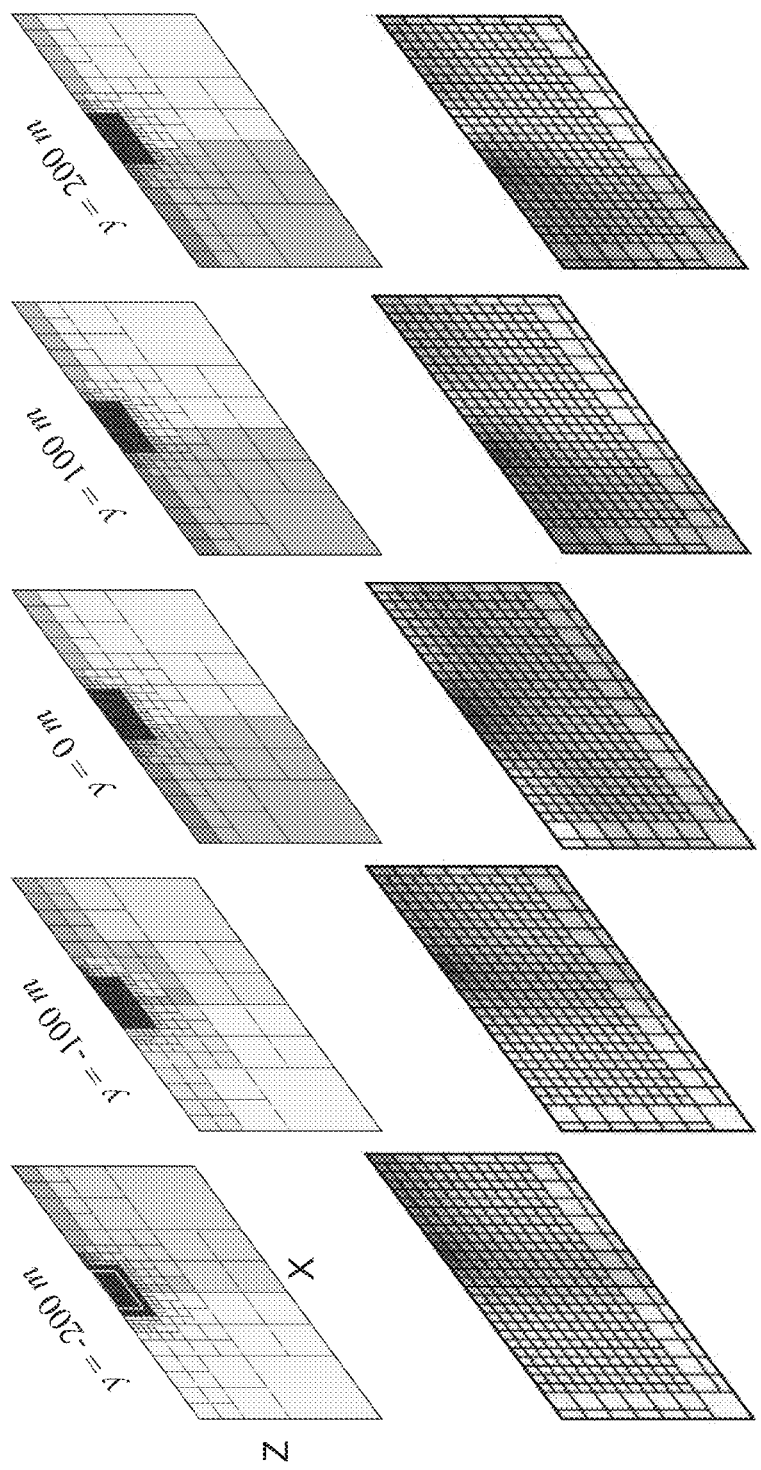
FIG. 2 is a schematic diagram of an XY slice of a three-dimensional training model generated by a random generation algorithm.

According to embodiments of the present disclosure, grids for a small-scale region are established for numerical simulations at first. Based on the precision of the target detection, an octree grid is used to subdivide the three-dimensional space, wherein grids in a simulation region are denser and gradually becomes sparser outward to improve the computational efficiency. The distribution of measuring points is smaller than the simulation region to simulate the TEM responses caused by anomalous bodies near the boundary. Subsequently, a hexahedral gird is used to interpolate the existing gird model, and the nearest neighbor algorithm is used to obtain a resistivity data with regular three-dimensional cube structure. FIG. 2 illustrates an XY slice of a three-dimensional training model generated by a random generation algorithm, wherein the upper figure shows the whole Octree grid space, and the lower figure shows the grids near the inversion target. Accordingly, the induced electromotive force data and resistivity model data generated by the simulation both have a cube structure for the training set.

In inversion, the whole region is decomposed into several small-scale regions for inversion, with region sizes and measuring point distributions consistent with the training set. The inverted results are reassembled according to the original order, allowing for overlap between different small-scale regions. The inverted results in overlapping areas are processed by weighted averaging. Finally, a large-scale three-dimensional inversion model can be reconstructed.

The present disclosure generates resistivity model to construct training set due to the scarcity of real underground resistivity distribution data. Since the performance of neural network depends on the diversity and representativeness of training samples to a great extent, a sufficient number and diversity of training data sets are essential to encompass all the possibilities of underground spatial structure for achieving generalizable prospecting. Therefore, the complexity of synthetic resistivity model is the first consideration. If the model is overly complex and its resolution exceeds the prospecting accuracy of TEM, it can lead to the neural network unable to learn the features of the model, resulting in poor predictive performance. Conversely, if the model is too simple, it can lead to a lower resolution of the inversion operator or a lack of generality.

Based on the above principles, the random model generation algorithm designed by the present disclosure follows the steps below:

a. generating a layered resistivity model R(l) at random, wherein the resistivity gradually increases with the depth, and the minimum resistivity follows a uniform distribution U (log 10 (1), log 10 (100)) Ω·m, while the resistivity variation range also follows a uniform distribution U (log 10 (100), log 10 (10000)) Ω·m;

b. generating a three-dimensional model grid m with values randomly distributed for each grid, thereby obtaining a random noise model;

c. smoothing the three-dimensional model;

d. normalizing the data of each layer of the smoothed three-dimensional model, and mapping it to a numerical distribution in the range [0,1];

e. applying the following formula to process the data of each layer in the case where the resolution of TEM exponentially attenuates with depth:

$$m(l) = (1.0 + m(l) * wight * e^{\tau l}) * R(l),$$

where l represents the number of layers, τ represents the attenuation index, with a higher τ corresponding to a smoother model, and m is a three-dimensional inhomogeneous resistivity model, in which the resistivity changes more smoothly with the increase of depth.

f. performing nearest neighbor interpolation on m using an octree grid to obtain a model suitable for rapid numerical simulation.

After a sufficient number of resistivity models are generated in the above way, the TEM response of the resistivity models is obtained by forward calculation using the finite volume method.

According to embodiments of the present disclosure, a U-Net network is employed to predict the nonlinear mapping between ATEM signals and model space.

Figure 3:
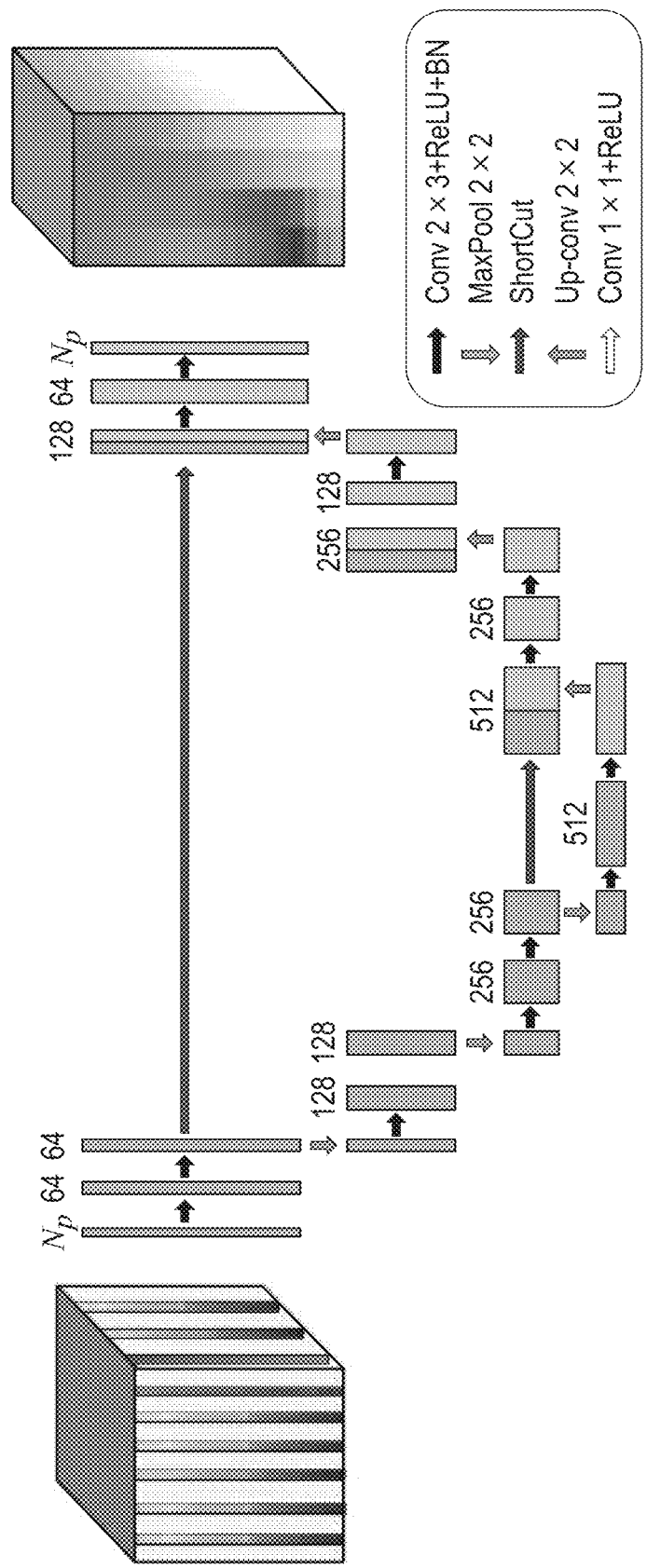
FIG. 3 is a schematic diagram of a U-Net framework used in the three-dimensional inversion of ATEM according to an embodiment of the present disclosure.

Compared with traditional neural networks, the U-Net introduces the skip connection to solve the problems of gradient vanishing and gradient explosion, which makes the network learn at greater depths. The U-Net model according to embodiments of the present disclosure is shown in FIG. 3. As shown, the input is TEM responses obtained by forward calculation of the resistivity model, with a data dimension of 16*16*23, wherein the layers form first to 21 the represent induced electromotive force data, which need to be logarithmic processed to prevent significant differences in magnitude. The 22th and 23th layer represent flight height and transmitting coil height, with each layer having identical neurons. The output is the resistivity spatial structure, with a data dimension of 16*16*13, and the output is also subjected to the logarithmic processing to keep its magnitude within the range of 0 to 6. The U-Net network includes 4 layers on each side, totaling 14 convolution layers, 3 pooling layers and 3 transposed convolution layers. RELU activation function acts on the output of the convolution layer; After convolution operation, Batch_normalization is used to standardize the data, so as to further prevent gradient vanishing or gradient explosion, and meanwhile enhance the regularization effect. In order to reduce over-fitting of data, L2 regularization is used for the weights of neurons in the last three layers. Finally, the mean square error between labels label and prediction results predi is used as the index to evaluate the performance of the U-Net:

$$mse = \|predi - \text{label}\|^2 + \lambda \|predi\|^2.$$

The second term of the above equation means that the L2 regularization is performed on the prediction results, so that it can not only fit the labels, but also be as smooth as possible, which is consistent with the resistivity model designed by the present disclosure. In addition, the step size and filter kernel size can be adjusted to the optimal hyperparameters through multiple rounds of testing.

Figure 4:
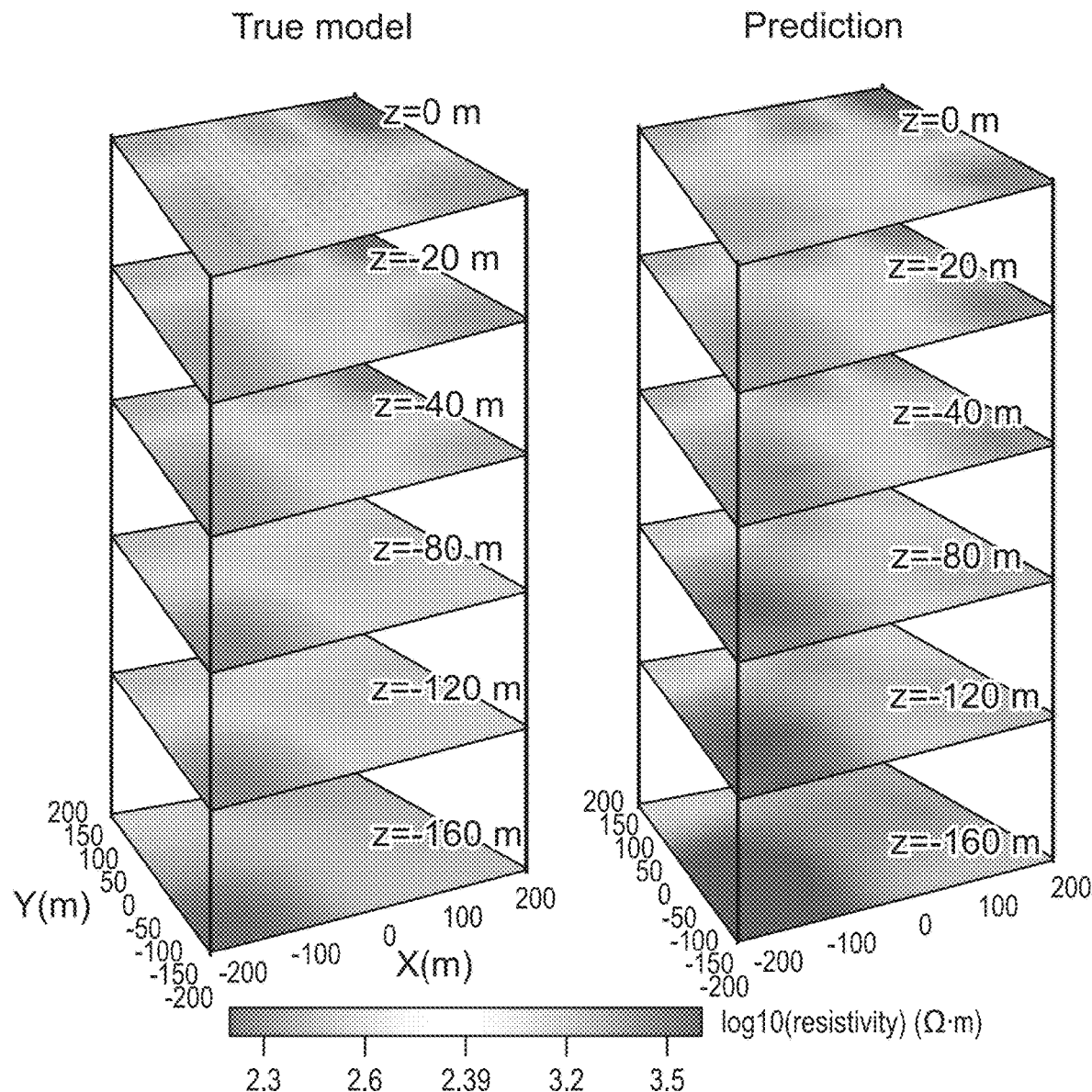
FIG. 4 is the prediction results of the U-Net.

In order to explore the performance of three-dimensional inversion algorithm of ATEM based on deep learning proposed by the present disclosure, a model as shown in FIG. 4 is designed for testing. The left model in FIG. 4 illustrates six XY plane slices of a true three-dimensional model, ranging in depth from the surface to a depth of 160 m underground. In the left model, there are three local low-resistivity anomalous bodies at shallow depths, and these low-resistivity anomalous bodies tend to disappear with the increase of the depth. The left model is subjected to three-dimensional finite volume numerical simulation, so as to obtain Z-direction induced electromotive force data at 15 m above the surface, and then the data is imported into the trained U-Net network as input. The right model in FIG. 4 illustrates the model predicted by the algorithm designed by the present disclosure at the same depth as the left-side model. It is evident that the prediction results are in good agreement with the true model, indicating the effectiveness of the algorithm proposed by the method according to embodiments of the present disclosure.

Figure 5:
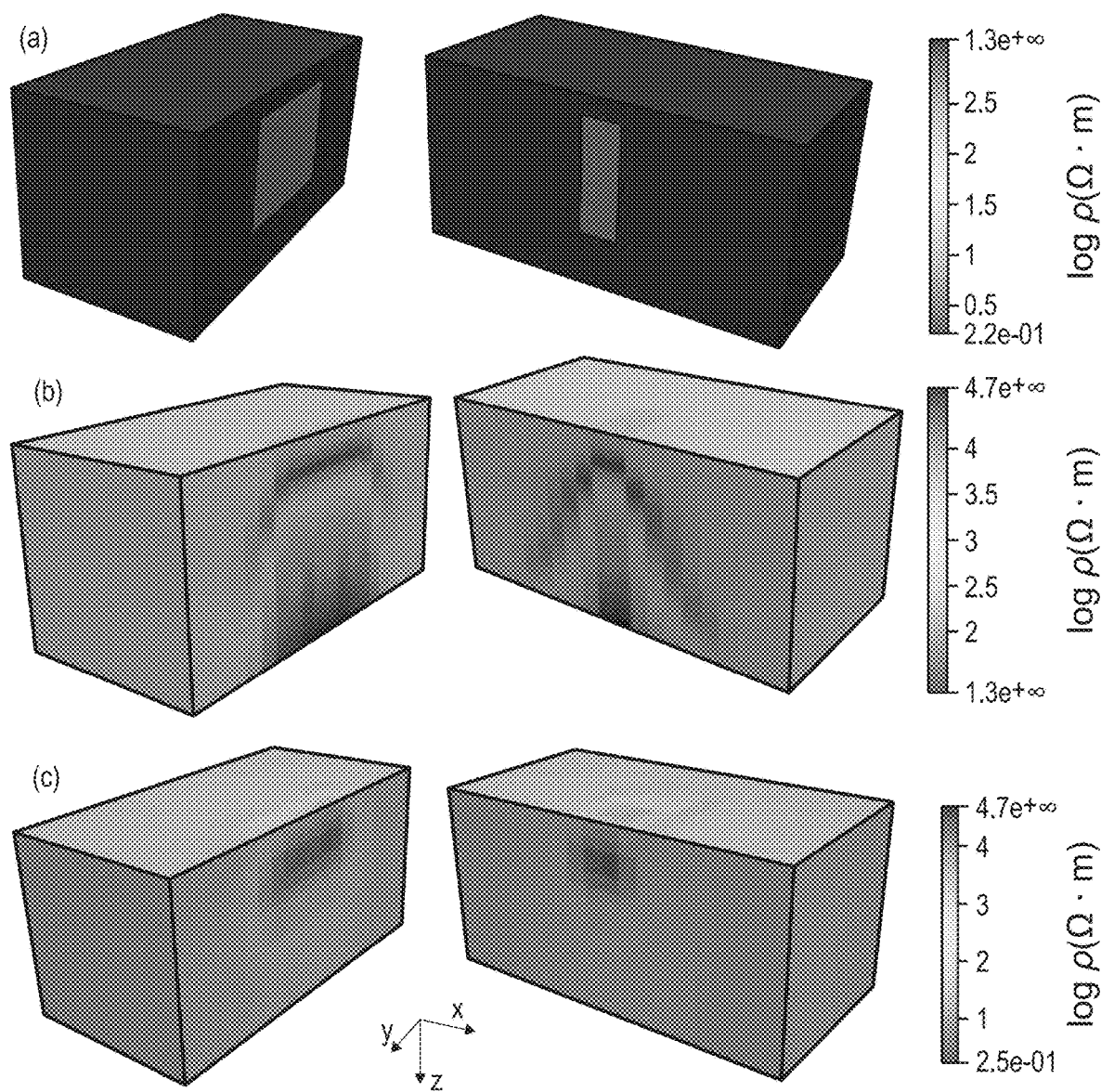
FIG. 5, including FIGS. 5 (a)-5 (c), is a comparative schematic diagram of the inversion results obtained using different models.

In order to illustrate the advantages of this algorithm, a theoretical model in FIG. 5 (a) is designed for inversion, FIG. 5 (b) is the inversion result using the conventional one-dimensional quasi-Newton method, and FIG. 5 (c) is the prediction result using the U-Net model of the present disclosure. As can be seen, the prediction results of the U-Net can effectively reproduce the basic structure of the true model, while the one-dimensional inversion exhibits obvious false anomalies with high resistivity; This indicates that in practice, the one-dimensional inversion algorithm may yield unreliable prediction results. Moreover, the advantages of U-Net are more reflected in the efficiency of the algorithm. The one-dimensional inversion is based on the layered model to invert the induced electromotive force at each measuring point, and then the inversion results are combined into a three-dimensional model. The inversion time for each measuring point is about 30 seconds, with a total of 256 measuring points, resulting in a total time of about 2 hours. However, once the U-Net model is trained, the prediction process can be completed within 1 second, which greatly improves the inversion efficiency.

Figure 6A:
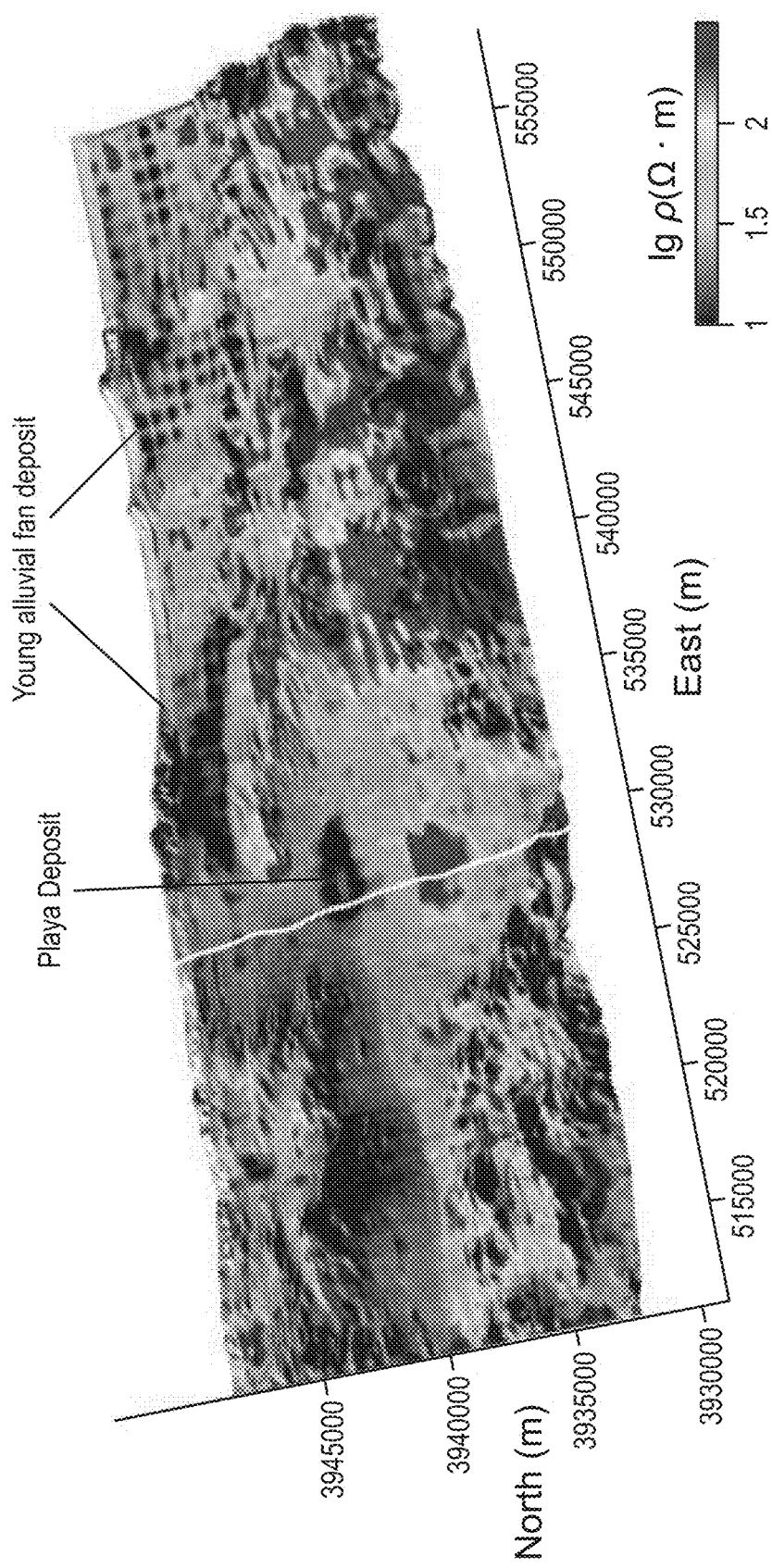
FIG. 6, including FIGS. 6 A-6 C, is a test schematic diagram of the method of the present disclosure applied to the real field ATEM data.
Figure 6C:
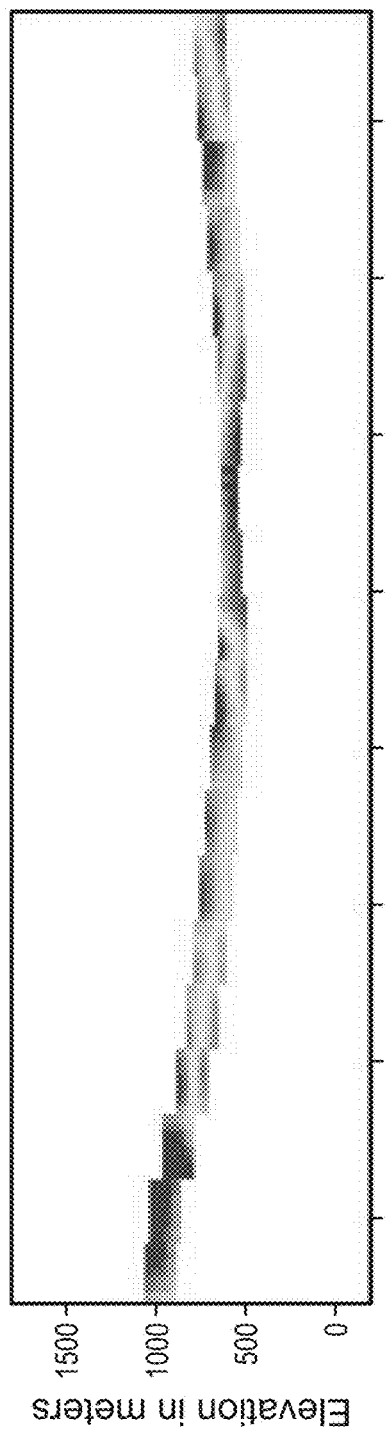
Figure 6B:
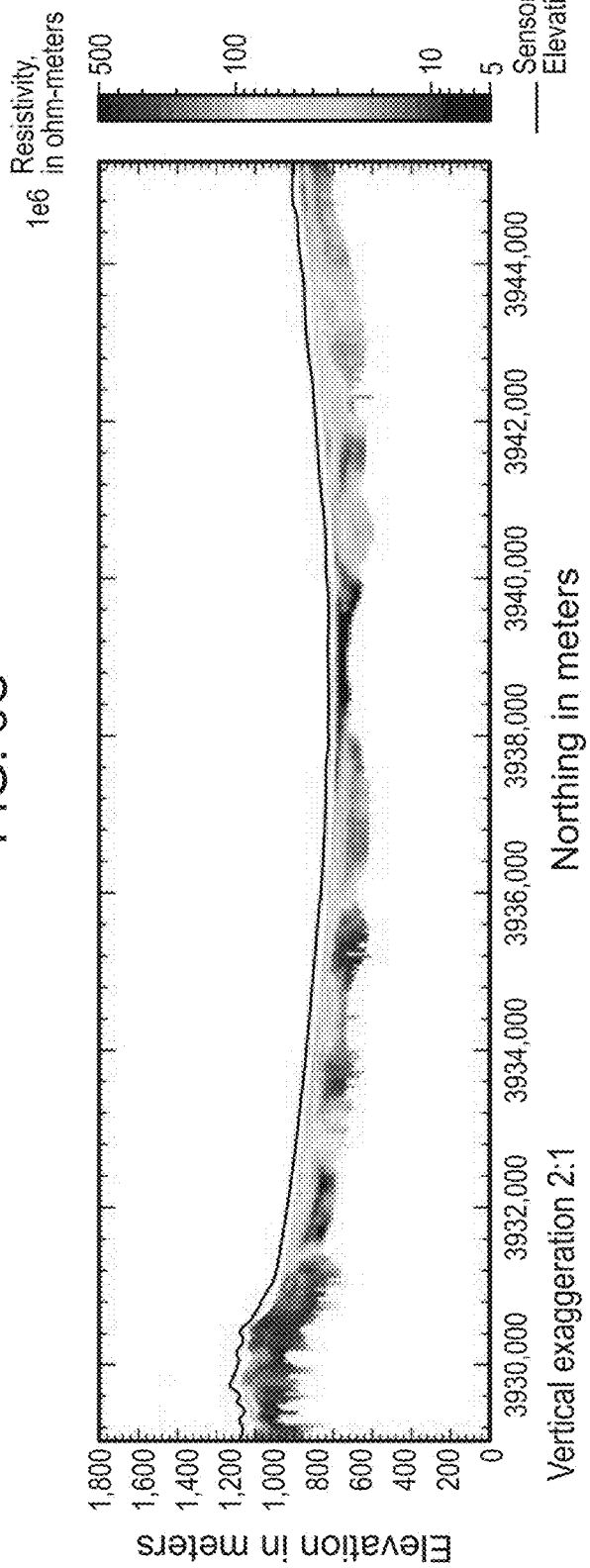

In addition, FIG. 6 illustrates the testing of real field ATEM data using the three-dimensional inversion method of ATEM based on deep learning according to embodiments of the present disclosure, wherein the airborne transient electromagnetic data collected by USGS in Leach Lake Base, Fort Irwin, California, USA is selected to be fed into the model of the present disclosure. As shown in FIG. 6 A, the resistivity values near the surface predicted by the U-Net are superimposed on a topographic map. Generally, the resistivity values at shallow depths show high resistivity or sub-high resistivity in mountainous areas, but medium resistivity or low resistivity in basins and plains, which is consistent with the basic geological laws. In the FIG. 6 A, two low-lying areas (Playa sediment and diluvial fan) correspond to areas with low resistivity, indicating higher surface water content in these areas. FIG. 6 B and FIG. 6 C show the vertical profiles of the conventional quasi-Newton one-dimensional inversion model and the U-Net three-dimensional inversion model, respectively, which is located at the white line of the FIG. 6 A. It is evident that the overall resistivity structures of the two inversion models are consistent and correspond well to the surface resistivity. The above inversion results fully demonstrate the effectiveness of the algorithm of the present disclosure.

The above merely describes specific embodiments of the present disclosure, which is not intended to limit the scope of protection of the present disclosure. Any modifications, equivalent variations or substitutions, and improvements made within the spirit and principle of the present disclosure by those skilled in the art according to the disclosed technical scope should be included in the protection scope of the present disclosure.

The invention claimed is:

1. A three-dimensional inversion method of airborne transient electromagnetics based on deep learning, comprising:
   decomposing a target region to be prospected into at least two local three-dimensional models;
   generating at least 5,000 underground resistivity models at random, performing forward calculation on the underground resistivity models to obtain transient electromagnetic responses, and constructing a training dataset for each of the local three-dimensional models;
   constructing a deep learning network model and training it based on the local three-dimensional models and the transient electromagnetic responses; and
   inverting each of the local three-dimensional models, and then recombining inverted local three-dimensional models to form a final three-dimensional model;
   wherein generating the underground resistivity models using a random model generation algorithm comprises:
   generating a layered resistivity model R (1) at random, wherein a resistivity gradually increases with a depth, and a minimum resistivity obeys a uniform distribution U (log 10 (1), log 10 (100)) Ω·m, while a resistivity variation range obeys a uniform distribution U (log 10 (100), log 10 (10000)) Ω·m;
   generating a three-dimensional model grid m with values randomly distributed for each grid, thereby obtaining a random noise model;
   smoothing the three-dimensional model;
   normalizing data of each layer of the smoothed three-dimensional model, and mapping it to a numerical distribution in a range [0,1];

applying a formula to process the data of each layer in the case where the resolution of transient electromagnetic exponentially attenuates with depth, wherein the formula is:

$$m(l) = \left(1.0 + m(l) * wight * e^{\tau l}\right) * R(l),$$

where l represents the number of layers, τ represents the attenuation index, with a higher τ corresponding to a smoother model; the wight controls an overall smoothness, which is the same for each layer but different for each model, with a value range of [0.2,1]; m is a three-dimensional inhomogeneous resistivity model, in which with the increase of depth, the resistivity changes more smoothly; and R (l) represents a function of resistivity varying with depth; and performing nearest neighbor interpolation on m using an octree grid to obtain a model suitable for rapid numerical simulation.

2. The three-dimensional inversion method of airborne transient electromagnetics based on deep learning according to claim 1, wherein a size of an inverted local region and a distribution of measuring points are consistent with the training dataset, inversion results are reassembled according to an original order, and the inversion results of overlapping parts between different local regions are weighted averaged, thereby reconstructing a three-dimensional inversion model of the target region to be prospected.

* * * * *